United States Patent [19]
Tanaka

[11] Patent Number: 5,784,501
[45] Date of Patent: Jul. 21, 1998

[54] IMAGE PROCESSING METHOD AND APPARATUS

[75] Inventor: Tetsuomi Tanaka, Yokohama, Japan

[73] Assignee: Canon Kabushiki Kaisha, Tokyo, Japan

[21] Appl. No.: 235,133

[22] Filed: Apr. 28, 1994

Related U.S. Application Data

[63] Continuation of Ser. No. 699,598, May 14, 1991, abandoned.

[30] Foreign Application Priority Data

May 15, 1990 [JP] Japan ................. 2-125935

[51] Int. Cl.$^6$ .................................. G06K 9/32
[52] U.S. Cl. ....................... 382/286; 382/305; 382/295
[58] Field of Search ................. 382/9, 16, 44, 382/46, 47, 286, 305, 293, 295

[56] References Cited

U.S. PATENT DOCUMENTS

| | | | |
|---|---|---|---|
| 3,710,323 | 1/1973 | Andrews et al. | 340/146 |
| 4,173,015 | 10/1979 | Owens et al. | 382/9 |
| 4,533,959 | 8/1985 | Sakurai | 382/46 |
| 4,658,424 | 4/1987 | Bedros et al. | 382/46 |
| 5,062,141 | 10/1991 | Wakayama et al. | 382/9 |
| 5,077,811 | 12/1991 | Onda | 382/44 |
| 5,113,453 | 5/1992 | Simon | 382/16 |
| 5,136,659 | 8/1992 | Kaneko et al. | 382/16 |
| 5,481,626 | 1/1996 | Matsubayashi | 382/189 |

FOREIGN PATENT DOCUMENTS 58-114176  7/1983  Japan.

OTHER PUBLICATIONS

"Approach To Smart Document Reader System", I. Masuda, et al., Proceedings Computer Vision And Pattern Recognition, Jun. 19, 1985, pp. 550–557.

*Primary Examiner*—Christopher S. Kelley
*Attorney, Agent, or Firm*—Fitzpatrick, Cella, Harper & Scinto

[57] ABSTRACT

An image processing apparatus comprises: two table memories; a producing circuit for executing a process according to a kind of each character image and for producing contents in the table memories; a character memory to store the image as an object to be recognized; a feature extractor for adding the data in the table memories and for executing a character feature extracting process after normalization of the character image by the bit data in the character memory corresponding to the addition result; a memory to store data indicating to which one of binary values of 1 and 0 the character image portion belongs; and a circuit for inverting the image data from the character memory to the feature extractor by the stored data and for outputting. The apparatus receives image data of characters of various type styles and outputting directions and can convert into the normalized image data such as to be easily processed.

34 Claims, 9 Drawing Sheets

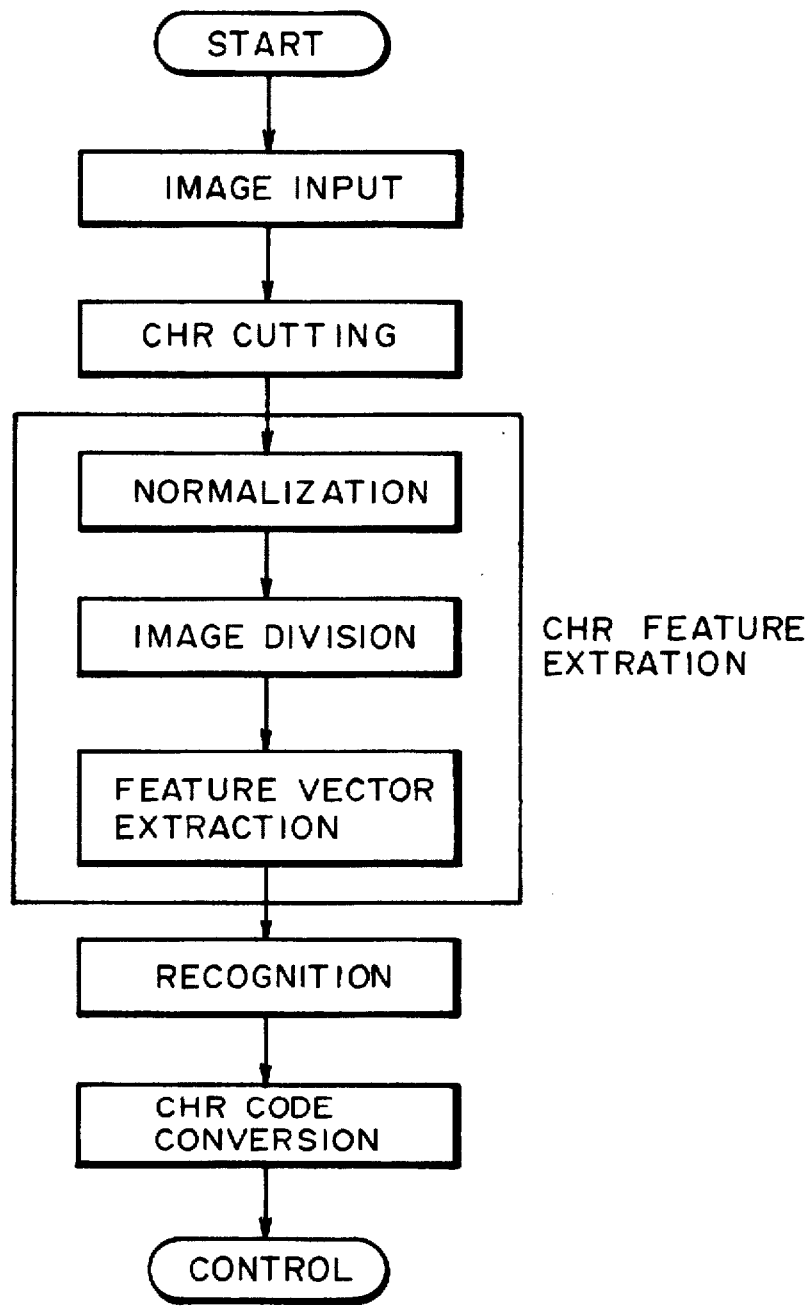
FIG. IA $$A(x) = \frac{(w \cdot x)}{N} + w_0$$
$$B(y) = \left(\frac{(h \cdot y)}{N}\right) \cdot w \cdot 2^3$$

$$A(x) = \frac{((c-a) \cdot x)}{N} + a$$
$$B(y) = \left(\frac{((d-b) \cdot y)}{N} + b\right) \cdot w \cdot 2^3$$

$$A(x) = \frac{(w \cdot x)}{N} + w_0$$
$$B(y) = \left(\frac{(h \cdot y)}{N}\right) \cdot w + S) \cdot 2^3$$

$x = 1 \sim N$
$y = 1 \sim N$ $$A(x) = \frac{(w \cdot x_1)}{N} + w_0$$

$$B(y) = \left(\frac{(h \cdot y)}{N}\right) \cdot w \cdot 2^3$$

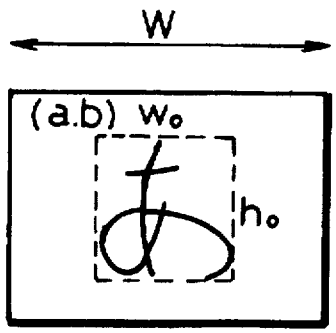

ACCESS DIRECTION 

$$A(x) = \frac{(w_0 \cdot x)}{N} + a$$

$$B(y) = \left(\frac{(h_0 \cdot y)}{N} + b\right) \cdot \overline{W} \cdot 2^3$$

FIG. 4A

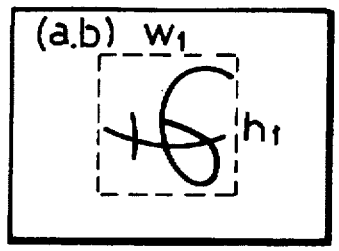

$$A(x) = \left(\frac{h_1 \cdot (N-x+1)}{N} + b\right) \cdot \overline{W} \cdot 2^3$$

$$B(y) = \frac{(w_1 \cdot y)}{N} + a$$

FIG. 4B

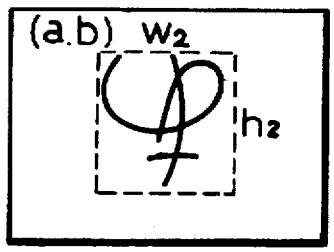

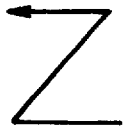

$$A(x) = \frac{(w_2 \cdot (N-x+1))}{N} + a$$

$$B(y) = \left(\frac{h_2 \cdot (N-y+1)}{N} + b\right) \cdot \overline{W} \cdot 2^3$$

FIG. 4C

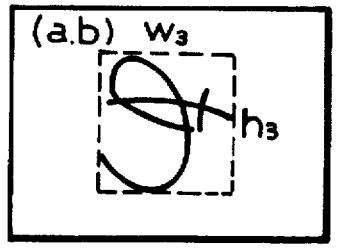

$$A(x) = \left(\frac{(h_3 \cdot x)}{N} + b\right) \cdot \overline{W} \cdot 2^3$$

$$B(y) = \frac{w_3 \cdot (N-y+1)}{N} + a$$

$x = 1 \sim N$ $y = 1 \sim N$

FIG. 4D $$A(x) = \frac{(w \cdot x)}{N} + a$$

$$B(y) = \left(\frac{(h \cdot y)}{N} + b\right) \cdot W \cdot 2^3 + \underbrace{\frac{(w_I \cdot (N-y+1))}{N}}_{\text{CORRECTION}}$$

$x = 1 \sim N$
$y = 1 \sim N$ $$A(x) = \frac{(w \cdot x)}{N} + a + w_A + \left(\frac{(h_A \cdot x)}{N}\right) \cdot W \cdot 2^3$$

$$B(y) = \left(\frac{(h \cdot y)}{N} + b\right) \cdot W \cdot 2^3 + \frac{(w_A \cdot (N-y+1))}{N}$$

$$A(x) = \frac{(W \cdot h)}{N} + a + \left(\frac{h_A \cdot (N-x+1)}{N}\right) \cdot W \cdot 2^3$$

$$B(y) = \left(\frac{(h \cdot y)}{N} + b + h_A\right) \cdot W \cdot 2^3 + \frac{w_A + y}{N}$$

$$x = 1 \sim N$$
$$y = 1 \sim N$$

DIRECTION INDEX

IMAGE PROCESSING METHOD AND APPARATUS

This application is a continuation of application Ser. No. 07/699,598 filed May 14, 1991, now abandoned.

BACKGROUND OF THE INVENTION

1. Field of the Invention

The present invention relates to image processing method and apparatus in which image data of characters of various type styles and output directions is input and can be converted into image data which has been normalized so as to be easily processed.

2. Related Background Art

Hitherto the following various drawbacks are considered with respect to the recognition of characters.

Conventionally, in a character recognizing apparatus, a converting process from a character image into a character code is executed after completion of the steps such as character cutting-out process, character feature extracting process, and recognizing process. Generally, a character image format which is sent from the character cutting-out step to the character feature extracting step is constant. The feature extraction denotes a process such that a character image is normalized and the normalized image is divided into blocks and feature amounts of the character such as direction index, background density, and the like are generated as feature vectors on a block unit basis.

However, in the above conventional method, since the character image format is fixed, in the case of considering various systems which need character recognizing means, in order to cope with an image format which is convenient to each of the systems, the character image format itself must be converted into the format which is used as a prerequisite by the feature extractor or the feature extractor itself must be changed. In the former case, it takes an additional processing time. In the latter case, much labors are required every change of the feature extractor, so that it is uneconomical.

Hitherto, in the case of recognizing a blank character, the character image to be recognized is inverted and, thereafter, the ordinary recognizing process is executed.

However, in the conventional method, a surplus time for the character image inverting process is needed.

As a direction of a character, various directions such as "あ" (which reads "a"), "⍺", "⍵", "ⅎ", and the like are considered. However, conventionally, only the character in a predetermined direction such as "あ" is recognized. Or, the apparatus copes with such various directions by rearranging feature vectors.

In the conventional method, however, since the character direction which can be recognized has been predetermined when an A4 document as shown in FIG. 10 is read by using an A4 scanner, the document image must be read separately two times by the scanner. Or, even if such an A4 document can be read, a long processing time is needed (rearrangement of feature vectors).

The above drawbacks will now be practically explained with reference to FIG. 11. Feature vectors are obtained by dividing a character image into a plurality of blocks as shown in FIG. 11A and by obtaining histograms about a direction index, densities of black and white pixels, and the like of each block.

In the example shown in the diagrams, direction indices 1 to 4 shown in FIG. 11C are used as feature amounts. A character image having such feature amounts of FIG. 11A is rotated by an angle of 90°, so that an image as shown in FIG. 11B is derived. Features of the images of FIGS. 11A and 11B are similarly extracted. The direction index 1 in FIG. 11A is extracted as a direction index 3 in FIG. 11B. On the other hand, the feature of the block 2 in FIG. 11A corresponds to the feature of the block 9' in FIG. 11B. Therefore, by executing the operations such that the direction indices (1 and 3) and (2 and 4) of the feature vectors of FIG. 11B are converted and the feature of the block 1' is changed to the feature of the block 4, the feature vectors of FIGS. 11A and 11B are equalized. The feature amounts such as a pixel density and the like can be also equalized by such a rearranging process. In the case of setting another feature amount to a feature vector, it is considered that a converting method also exists.

In the case of recognizing a character train whose character directions are unknown, the character is discriminated in terms of four directions and the direction of the character is decided and even after the character direction was known, the feature vectors must be rearranged.

In the conventional method, however, even after the character direction was known, the character direction must be converted by rearranging the feature vectors, so that it is irrational and it takes a long processing time.

Hitherto, it is impossible to process an inclined character style such as an Italic style or means for another Italic style must be used.

To recognize an inclined character, hitherto, the image must be again input by the scanner or the image itself is rotated.

In the conventional method, however, in the case of again reading the image by the scanner, there are drawbacks such that the user is burdened and, in the case of rotating the image, a recognizing efficiency deteriorates due to the rotating time and the deformation of the character image.

Hitherto, an image to be recognized is divided on a character unit basis and is subjected to processes after a feature extraction.

In the conventional method, however, in order to discriminate whether, for instance, a character "いい" corresponds to one character or two characters, three images of "いい", "い", and "い" are produced from the same image, so that it is irrational and the image which is inherently a single image must be managed by three images. Consequently, there are drawbacks such that it is troublesome to manage the images and it takes a long processing time to produce the character image.

For instance, in the case of an image of one page of an A4 document having a resolution of 400 d.p.i., 24 bits (2 MBytes) are necessary as a bus width of a table memory, so that the bus width and the memory size increase. There is a drawback such that the processing time increases in the case of reading out the image by two accessing operations by setting the bus width to 16 bits.

SUMMARY OF THE INVENTION

According to the invention, by providing two normalization table memories A and B and a computer to form the contents of the tables in accordance with a character format, the following advantages are obtained.

① It is possible to cope with many kinds of character image formats without changing a feature extractor.

② Since the number of normalization addresses which are calculated by a processors is equal to 2N instead of $N^2$, a processing burden is relatively small.

③ When the feature extractor calculates the normalization bit addresses, only a simple addition is performed, so that arithmetic operations are simplified.

According to the invention, by providing means for inverting or non-inverting data in a character image memory and for generating to the feature extractor, the following advantages are derived.

① A blank character can be recognized.

② Since a character image itself is not inverted, the processing time is unchanged.

According to the invention, by providing two normalization table memories A and B and a computer for changing the normalization bit address arithmetic operations on the basis of the character direction, the recognizing process can be performed in any character direction in the same processing time as that by the ordinary method without changing the feature extractor.

As described above, by using a recognizer having the feature vector rearranging function, the discriminating process of the character direction and the recognizing process can be automatically executed at a high speed.

According to the invention, by providing two normalization address table memories A and B and a computer for calculating normalization addresses by correcting an angle of inclination of a character, an Italic style can be recognized in a manner similar to the ordinary method.

As described above, by providing two normalization table memories A and B and the computer for calculating the normalization addresses by correcting an inclination angle of a character, a recognition ratio of an inclined character is improved.

According to the invention, by increasing a character storing memory and by providing a manager, a process to discriminate whether the width of character is standard or half and a process to discriminate a position can be performed in a lump.

According to the invention, by providing shift adding means to the feature extractor, it is possible to realize a character recognizing apparatus in which a table memory size is small and a size of character image memory which is connected is large.

According to the invention, by providing means for storing the character direction and feature extractor normalization address shift adding means corresponding to the storage, it is possible to realize a character recognizing apparatus in which a table memory size is small, a size of character image memory which is connected is large, and a character in an arbitrary character direction can be recognized without a change in processing time.

BRIEF DESCRIPTION OF THE DRAWINGS

FIG. 1A is a diagram showing an algorithm of a recognizing process;

FIGS. 4A to 4D are explanatory diagrams of a character direction process of ③;

DESCRIPTION OF THE PREFERRED EMBODIMENTS

An embodiment of the invention will be described in detail hereinbelow with reference to the drawings. The invention can be realized by one apparatus or can be also realized by a system comprising a plurality of apparatuses. The invention can be also realized by supplying a software to a personal computer or the like.

FIG. 1A is a diagram showing a flow of recognizing processes. As will be obviously understood from the diagram, a character feature extractor comprises a normalization, a block division of an image, and a feature vector extraction. A feature extracting process after the normalization step, which will be explained hereinlater, denotes a process to divide an image into blocks and a process to extract feature vectors. The feature vector extracting process includes: a process to extract direction indices and pixel densities on a block unit basis; a process to dimensionally reduce the block by executing a filtering process to the block, for example, a process to compress the block of 7×7 to the block of 4×4; and the like.

The feature extracting process according to the invention denotes processes such that irrespective of a decision regarding whether an image normalized to a certain size is formed from a given character image or not, black and white pixel data of the normalized image is obtained from pixel data in bit addresses (normalization bit addresses) on the character image which is derived from the normalization address table and feature amounts of the character are extracted and generated as feature vectors. Arbitrary amounts such as direction amount of character, density amount of black and white pixels, and the like can be used as feature amounts. Even if an original character image and light and dark data (multivalue image) have been provided, no problem occurs. The invention can be used in all of the algorithms to normalize the original character image to obtain feature amounts of the character.

The normalization address table is formed by the computer and comprises two kinds of N tables (A and B) which are obtained by an arithmetic operation suitable for each character image in accordance with an instruction indicative of which type style or which state the character image as an object to be processed has.

The data of one desired point in the normalization image data is obtained as follows. Namely, an x coordinate A(x) is extracted from x coordinates stored in the table A and a y coordinate B(y) is extracted from y coordinates stored in the table B in accordance with the coordinates of the desired one point. Both of the x and y coordinates are added like A(x)+B(y), thereby obtaining a normalization bit address. Data of one point in the character memory indicated by the above address is obtained as such data.

① [Two normalization tables]

Figure 1B:
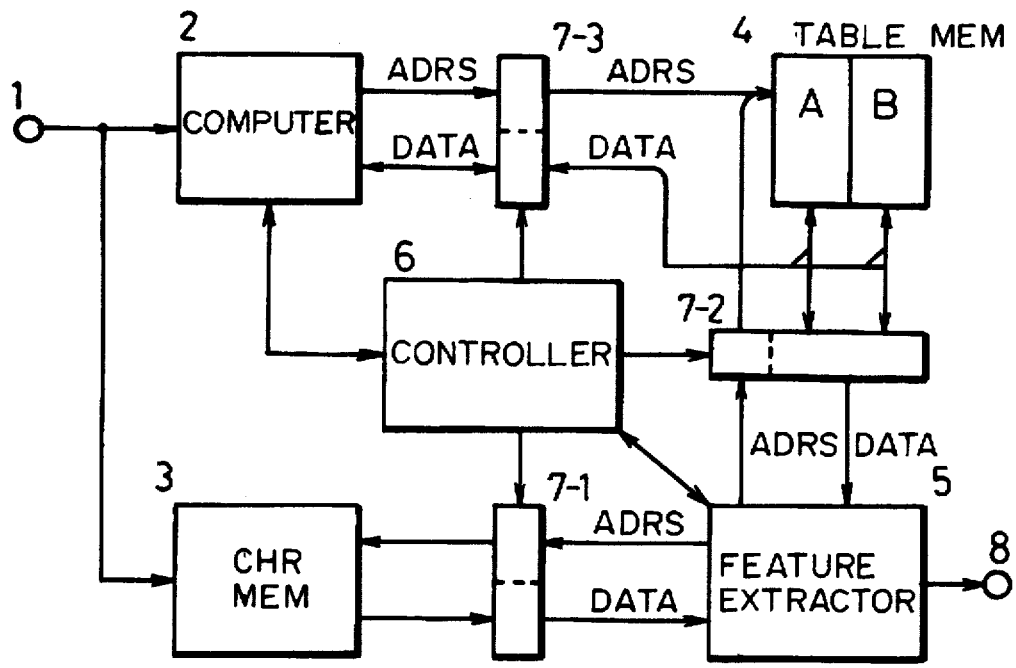
FIG. 1B is a constructional diagram of an embodiment of the invention.

FIG. 1B is a diagram showing most preferably a feature of the invention and is a detailed explanatory diagram of a characteristic feature extractor in FIG. 1A. In the diagram, reference numeral 1 denotes an input section from a character cutting-out section at the front stage. Character cut-out data such as a character position and the like which are necessary to the recognizing process in a character memory and a character image are sent from the input section. Reference numeral 2 denotes a computer having a program memory and a data memory; 3 a character image memory to store the character image; 4 two table memories A and B to store normalization addresses; 5 a feature extractor to execute a feature extracting process after the normalization to the character image in the character memory 3 with reference to the table memories 4; 6 a controller for switching external accesses to the memories and for executing a whole control of the feature extractor and the like; 7-1 to 7-3 buffers for receiving signals from the controller 6 and for controlling accesses to the memories; and 8 an output section to send the feature vectors from the feature extractor 6 to a recognizer at the next stage.

Figures 2A, 2B:
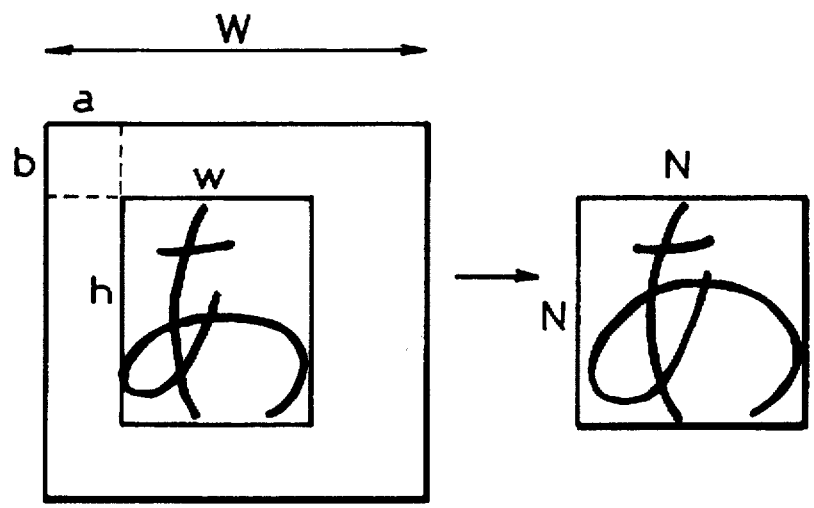
FIGS. 2A and 2B are explanatory diagrams for character normalization.

It will now be considered the case where a character image of FIG. 2A is normalized to an image of a size of N×N as shown in FIG. 2B. It is now assumed that a word unit in the character memory is set to one byte and that a bit order in one byte is set to MSB→LSB and that the bits 0 to 7 are ordered in a manner such that the bit 7 corresponds to 0 and the bit 0 corresponds to 7. Therefore, the bit 7 in the address 0 indicates the bit address 0 and the bit 7 in the address 1 indicates the bit address 8.

A point on the original character image of FIG. 2A in the case where a point (x, y) on the normalized image of FIG. 2B has been given is calculated as follows.

$$\left( \frac{(\omega \times x)}{N} + a \right)$$

for the lateral direction $$\left( \frac{(h \times y)}{N} + b \right)$$

for the vertical direction
where,

W: the number of bytes in the lateral direction (a, b): coordinates of one point of a character rectangle ω: the number of dots in the lateral direction h: the number of dots in the vertical direction N: normalization size As will be obviously understood from FIG. 2A, since a length of character in the lateral direction is equal to W bytes (=W·2³ bits), the bit address on the original character image of FIG. 2A is obtained as follows.

Bit address $$(x,y) = \frac{(\omega \times x)}{N} + a + \left( \frac{(h \times y)}{N} + b \right) \cdot W \cdot 2^3$$

... (1) ... (2)

where, it is sufficient to perform all of the arithmetic operations using integers.

Since the above bit address is a bit address in the character memory 3 in which the data to form the normalization image has been stored, it is hereinafter referred to as a normalization bit address.

Therefore, the address of the point on the character image corresponding to the point on the normalized image is expressed by the result of the addition of the terms (1) and (2) of the above equation. The two table memories A and B are prepared and the results of the terms (1) and (2) are respectively stored into the table memories A and B in order to calculate the normalization bit address. The feature extractor calculates the normalization bit address by the addition value of the contents in the table memories A and B. The feature extracting process after the normalizing process is executed by using the point on the character image corresponding to the normalization bit address as data corresponding to the point on the normalized image. By using the above construction, the apparatus can cope with many kinds of character formats (for example, refer to FIGS. 3A, 3B, and 3C) by merely changing the contents in the table memories A and B.

Figure 3A:
FIGS. 3A to 3C show examples of character formats.
Figure 3B:
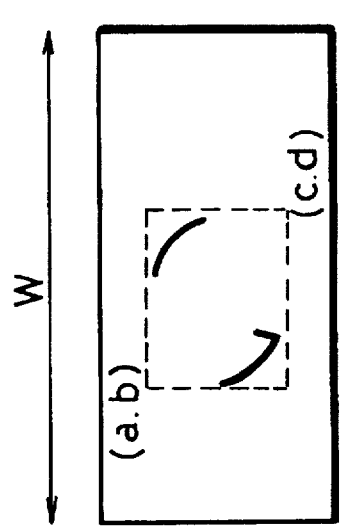
Figure 3C:
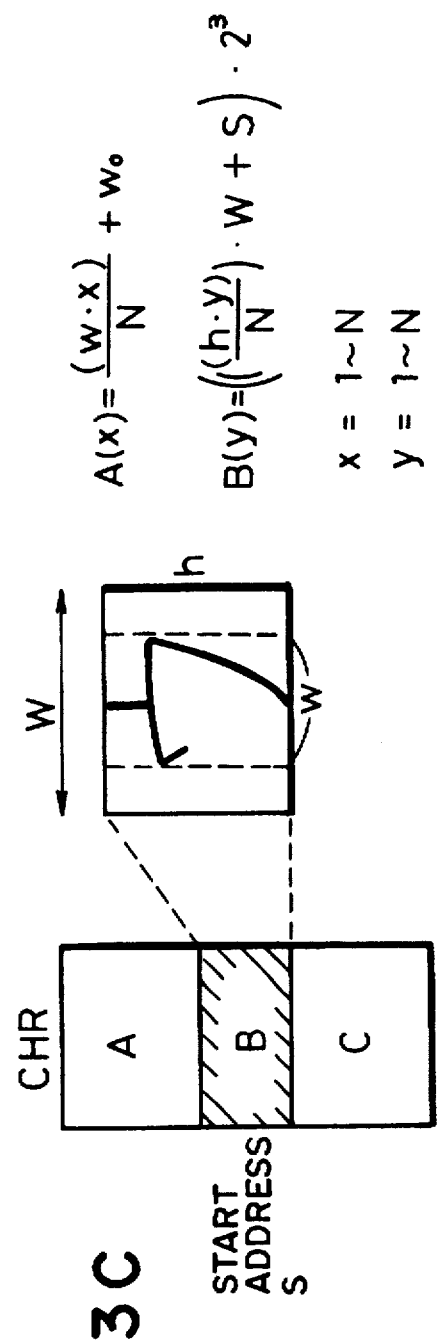

The actual operation will now be described with reference to formats shown in FIGS. 3A to 3C. FIG. 3A shows the format in which the character image is reduced as small as possible. FIG. 3B shows the format in which a character image is expressed by only two points of a circumscribed rectangle of a character. FIG. 3C shows the format in which a number of images whose character has been cut out are included in the character memory. Format data indicating which case in FIGS. 3A to 3C the cut-out character relates to and character position data by the character cutting-out process are supplied from the input section 1 to the computer 2. The actual character image is supplied to the character memory 3. The computer 2 first discriminates to which one of the types of FIGS. 3A to 3C the character format belongs on the basis of the format data and calculates the x and y coordinates A(x) and B(y) in each of FIGS. 3A to 3C and stores the calculated coordinates into the table memories 4 (A and B). The completion of the calculations is informed to the controller 6. The controller 6 transfers the access rights of the character memory 2 and the table memories 4 to the feature extractor 5 by controlling the buffers 7-1 to 7-3 and activates the feature extractor 5. The feature extractor 5 calculates the normalization bit address by the addition with reference to the contents in the table memories 4 (A and B) and reads the corresponding bit data from the character memory 3, thereby performing the feature extracting process after the normalizing process. The feature extractor 5 informs the end of the process to the controller 6 and generates resultant feature vectors to the output section 8. The controller 6 returns the memory access right to the original section after completion of the above processes and informs the computer 2 of the fact that the next process can be executed.

② [Process of blank character]

FIGS. 1A and 1B are diagrams showing most preferably the invention. Reference numeral 6 denotes the controller having means for storing the resultant data from the computer 2 indicating which one of the binary values of 1 and 0 the character image indicates. Reference numeral 7-1 denotes the buffer for receiving the signal from the controller 6, for adjusting the access right of the feature extractor 5 to the character memory 3, and for inverting or non-inverting the data from the memory 3 to the feature extractor 5.

Figure 3D:
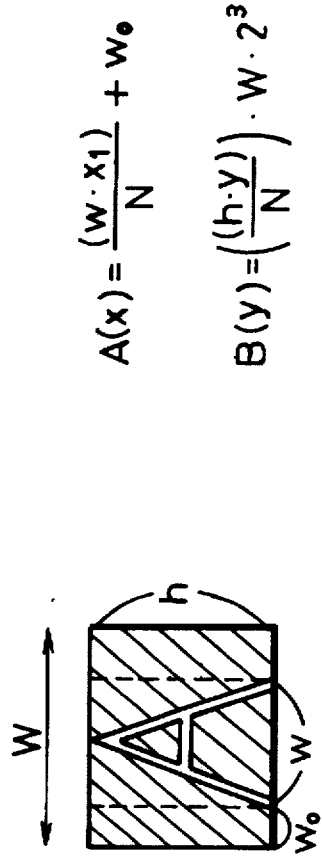
FIGS. 3D and 3E are diagrams showing examples of blank characters.

Explanation will now be made with reference to FIGS. 3A and 3D. FIG. 3D shows a character (blank character) which is obtained by inverting the character of FIG. 3A and their sizes and the like are almost equal. Now, assuming that the character main body of FIG. 3A corresponds to the binary value of "1", the character style of FIG. 3D corresponds to the binary value of "0". If the feature of the character of FIG. 3D is directly extracted, the feature which is quite opposite to that of the actual character "A" will be generated. Therefore, the feature data is temporarily stored into a memory in the controller 6 before the feature extractor 5 starts process. The controller 6 controls the buffer 7-1 so as to invert all of the data which are transmitted from the character memory 3 to the feature extractor 5. Thus, all of the binary values of "0" of the character main bodies are converted into "1" and the same features are extracted with respect to the character images of FIGS. 3A and 3D. A blank character and the like can be recognized by the above method.

Figure 3E:
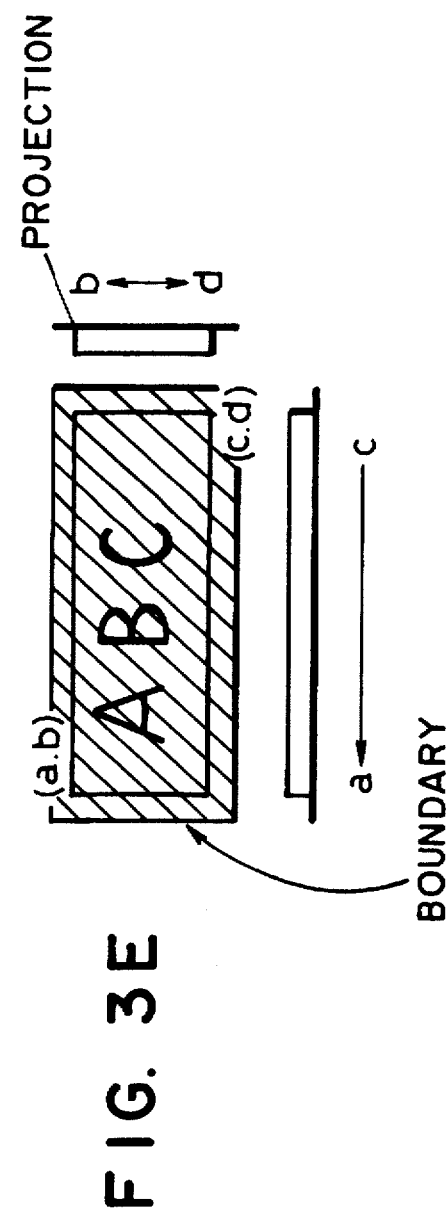

When a blank character is detected, the user designates an area so as not to include white pixels around the blank character. A character cutting-out section gets a projection in the vertical or lateral direction in the area. Explanation will now be made with reference to FIG. 3E. Now, assuming that the coordinates (a, b)–(c, d) on the document image have been designated and that the above projection is obtained, the projection is detected for the entire region between the designated coordinates a and c and between the designate coordinates b and d. Checks are now made to see if the pixels of the coordinates of (a, b) and (c, d) are set to "1" or "0". When generally assuming that the black pixel is set to "1" and the white pixel is set to "0", if both of the pixels are set to "0", it is determined that the character is a blank character and the character cutting-out process corresponding to the blank character is executed. Due to this, if the character cutting-out process has been succeeded, the character position data and the data indicative of the blank character are sent to the above structure. The reason why the coordinates are examined is to distinguish from the case where a document is inclined and the projection has been obtained for the entire region.

Or, it is also possible to first execute the above discriminating step about "0" and "1" for the coordinates of four points of the designated area.

③ [Two normalization tables+addition of direction of character]

FIGS. 1A and 1B are diagrams most preferably showing the invention and an explanation is substantially the same as that of ①.

Explanation will now be made with reference to FIGS. 4A to 4D. FIG. 4A shows the case of the ordinary character direction in which it is assumed that the character image is processed in the directions indicated by arrows and that the normalizing process is executed from the left upper position to the right lower position. FIGS. 4B to 4D show the cases where the character of FIG. 4A has been rotated by an angle of 90° at a time. However, if the character image has been normalized in the same manner as that of FIG. 4A, a feature which is quite different from that of the character of is "あ" extracted. Therefore, by processing the character image from the left upper position to the right lower position of the character, the normalized images of FIGS. 4B to 4D are the same as the image of FIG. 4A and the same feature vectors as those of FIG. 4A are extracted. That is, it is sufficient to rewrite the contents in the two table memories A and B in a manner such that the access is performed from the left lower position to the right upper position of the image in the case of FIG. 4B, from the right lower position to the left upper position in the case of FIG. 4C, and from the right upper position to the left lower position in the case of FIG. 4D. The equations on the left side are the normalization arithmetic equations. When comparing FIGS. 4A and 4B, in a form in which A(x) and B(y) in FIG. 4A are exchanged, the result of the arithmetic equation of B(y) is contrarily arranged in A(x) in FIG. 4B. When comparing FIGS. 4A and 4C, A(x) and B(y) in FIG. 4A are reversely stored into the table memories. That is, the calculation amounts to form the tables are not changed but a method of storing is merely changed.

Therefore, by merely changing a method of forming the contents in the table memories 4 in accordance with the character direction by receiving the data of the character direction in addition to the character position data from the input section 1, the characters in all of the directions can be recognized without exerting any influence on the feature extractor 5.

The operator designates the character direction and the document direction, the character cutting-out section cuts out the characters on the basis of those direction data, the character image and the character position data are sent to the above structure together with the data of the character direction, and contents in the table memories A and B are formed as shown in FIGS. 4A to 4D in accordance with the character direction as described above. After that, the feature extracting process and the recognizing process are executed and the results are generated.

Consequently, it is possible to solve the drawback such that one document is separately input by the scanner a plurality of times as in the case where the scanner inputting operation is again performed due to a mixture of vertical and lateral images or an erroneous setting of the document direction or the like.

④ [③+feature vector rearranging technique]

Figure 5:
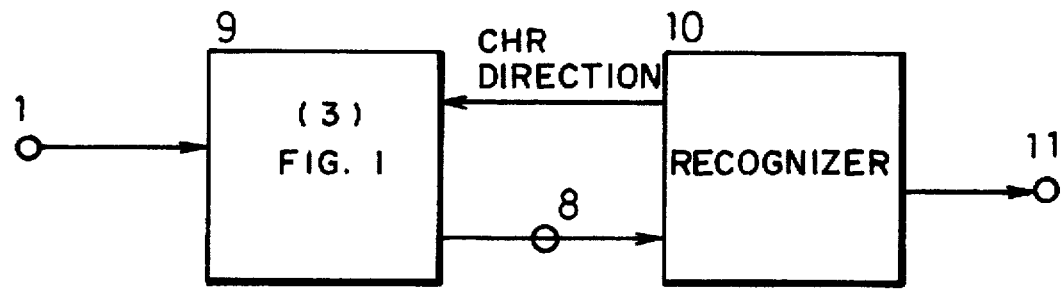
FIG. 5 is an explanatory diagram of an embodiment of ④.

FIG. 5 is a diagram showing most preferably the invention. Reference numeral 1 denotes the character input section to which the character position data and the character image are supplied. Reference numeral 9 denotes feature extractor which corresponds to ③ mentioned above and can process the character direction; 8 indicates the output section of the feature extractor 9 for generating feature vectors; and 10 a recognizer which generates the nearest character code by a distance calculation of the basis of the feature vectors derived from the output section 8. Reference numeral 11 denotes a character code output section. In the invention, the character direction is designated by the recognizer 10.

Characteristics of the feature vectors include a direction amount and background density of each block unit which is obtained by dividing the character image into M equal blocks. An effect similar to the process in ③ can be obtained by the rearrangement. However, the processing time is delayed by only a time which is required for rearrangement.

First, for a character train whose character directions are unknown, features of a few characters in the heat portion are extracted in the direction of FIG. 4A. Then, the rearranging process is executed in the recognizer 10 and the feature vectors of FIGS. 4B to 4D are formed and are recognized, respectively. The direction having the best mean value of the recognition results is sent to the feature extractor 9 as a character direction. The feature extractor 9 subsequently extracts the features in the designated direction. Due to this, it is possible to obtain a character recognizing apparatus which automatically determines the character direction and accomplishes a high recognition processing speed (there is no need to rearrange).

Figure 9:
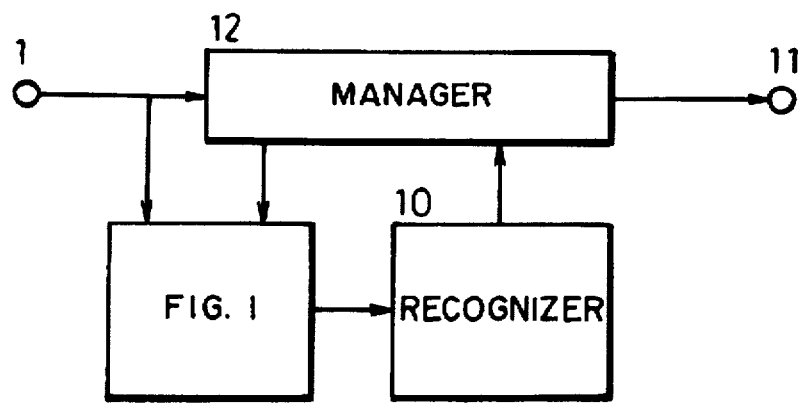
FIG. 9 is an explanatory diagram of an embodiment of ⑦.
Figure 10:
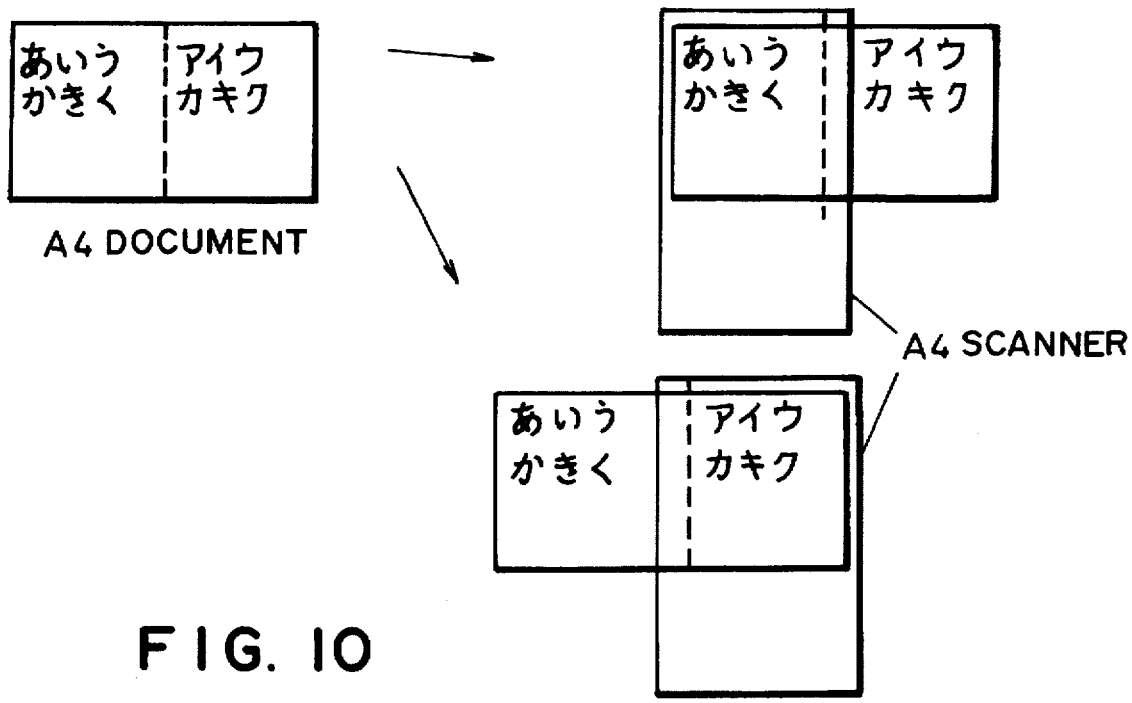
FIG. 10 is an explanatory diagram of a conventional example of ③.
Figure 11A:
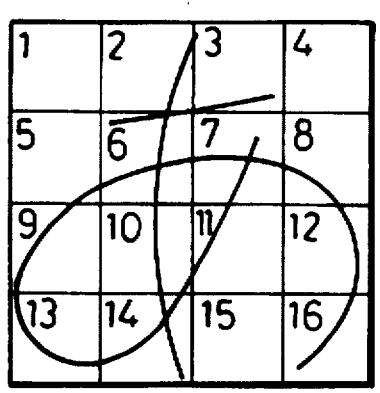
FIGS. 11A to 11C are explanatory diagrams of rearrangement of feature vectors.
Figure 11B:
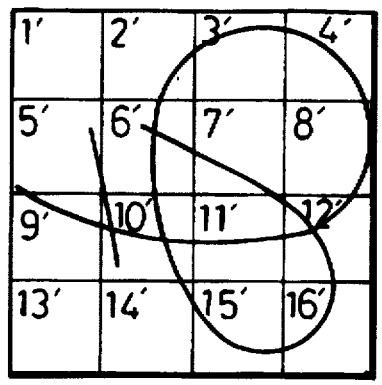
Figure 11C:
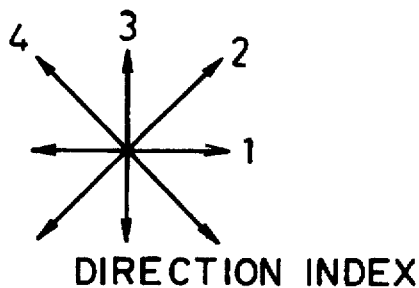

Actually speaking, for a document image of an obscure character direction, the character cutting-out section detects the lines in the vertical and lateral directions by an image projection or a histogram process, thereby obtaining the line direction. With respect to the lines obtained, characters are cut out from the lines in accordance with a predetermined order (order such that right→left or upper→lower) and are sent to the recognizer. The resultant candidate character train and the determined character direction are received from the recognizer. The candidate character train are rearranged on the basis of the data of the line direction which has been decided by the character cutting-out section and the character direction obtained from the recognizer, thereby forming a correct document. The character cutting-out section presumes the order of the character train so as to obtain a correct document on the basis of the line direction and the character direction corresponding thereto. The rearrangement is executed after the character cutting-out process was performed. In the case where the number of characters of each line of a line unit and the number of lines and the presumed line direction data and also sent to the recognizer, a manager 12 executes the rearrangement by constructing as shown in FIG. 9.

⑤ and ⑥ [①+correction of degree of inclination of character]

FIGS. 1A and 1B are diagrams most preferably showing the invention. Since the operations are similar to those of ①, their detailed explanation is omitted here.

Figure 6:
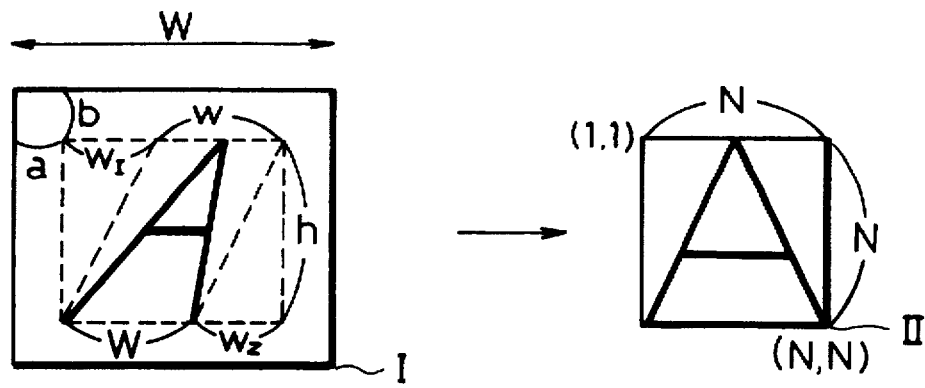
FIG. 6 is an explanatory diagram of an Italic style character process of ⑤.

Explaining with reference to FIG. 6, assuming that an Italic style character as shown in I in FIG. 6 exists, it is sufficient to form the contents in the table memories A and B so as to enable the normalizing process to be executed by correcting a degree of inclination. The second term $$\frac{\omega_I(N-y+1)}{N}$$

(where, $\omega_I$: degree of inclination) of B(y) of the equations shown in FIG. 6 corresponds to the above method. Due to this, the feature extractor 6 can correct the Italic style character and can extract features without changing and can also recognize such a character.

$\omega_I$ is detected by the character cutting-out section. For instance, in the case where a character having an extremely wide lateral width exists in the character train and the other characters can be normally cut out, a projection is obtained at an angle of Italic style (an angle of Italic style is substantially predetermined and such an angle can cover almost of the Italic style characters) and $\omega_I$ is approximately obtained. Due to this, data indicating that the character style is the Italic style and the character position data including the degree of inclination $\omega_I$ are sent to the above structure.

Or, the Italic style mode can be also designated by the user.

Figure 7A:
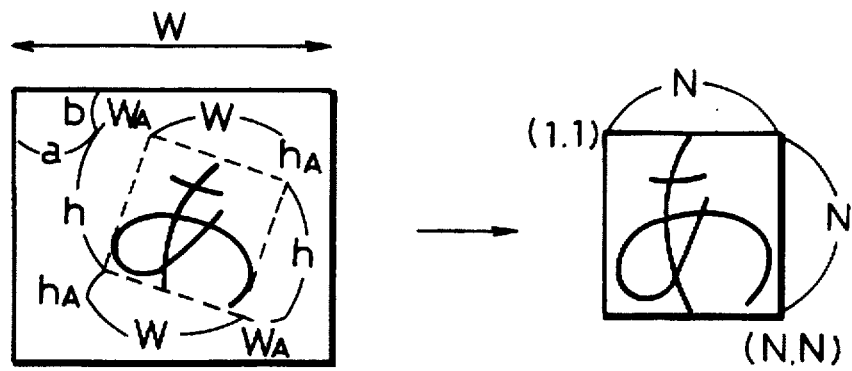
FIGS. 7A and 7B are explanatory diagrams of an inclined character process of ⑥.
Figure 7B:
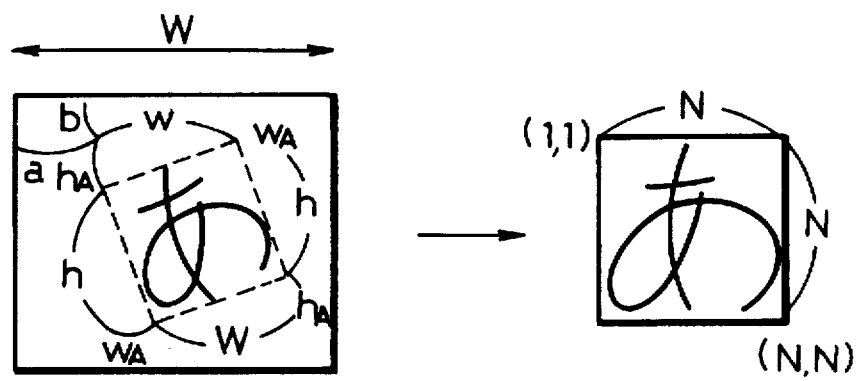

When two images of FIGS. 7A and 7 B are input, there is an inclined character image. However, by storing the normalization data whose inclination has been corrected into the two table memories A and B as shown in A(x) and B(y) of the following equations, respectively, the feature extractor 5 can extract the features of the corrected character of the inclined character without changing. Thus, a recognizing ratio for the inclined character is improved.

Degrees $\omega_A$ and $h_A$ of inclination of the character and the inclination direction are detected by the character cutting-out section. First, characters are cut out of the line by the ordinary method and a circumscribed rectangle is obtained. Then, an angle θ of inclination is obtained by a method of least squares of the center point of the lower edge portion of the circumscribed rectangle of the character (by a well-known example). After the inclination angle θ was obtained, a projection is got at such an angle and the inclination degrees $\omega_A$ and $h_A$ are obtained.

⑦ [Character storing section is widened]

FIG. 9 is a diagram most preferably showing the invention. Reference numeral 1 denotes the input section. The character image is sent to the character memory 2 in FIG. 1 from the character cutting-out section at the front stage of the input section 1. Each character data [for instance, positions of (1), (3), (4), and (5) in FIG. 8] is supplied to the manager 12. Reference numeral 10 denotes the recognizer for receiving the feature vectors from the construction of FIG. 1, for calculating a recognition distance, and for generating candidate characters and the distance value. Reference numeral 12 denotes the manager to manage FIG. 1 and the candidate characters and 11 indicates the output section for generating the recognition results.

Figure 8:
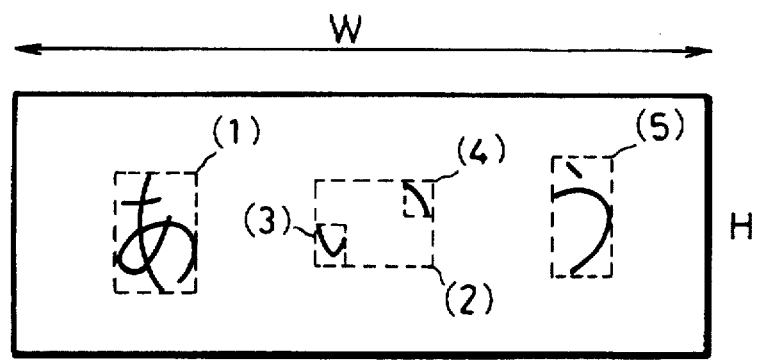
FIG. 8 is an explanatory diagram of a process of ⑦.

First, there has been mentioned in FIG. 1 that the features are extracted by the addition of the contents in the two table memories A and B. The maximum image size which can be handled depends on the number of bits of the addition result. For example, in the case where each data of A(x) and B(y) consists of 16 bits, the image of up to 8 kBytes can be handled. In the case of 24 bits, the image of up to 2 MBytes can be handled. Since arbitrary image formats (FIGS. 3A, 3B, and 3C) can be input to FIG. 1, a whole image as shown in FIG. 8 can be also recognized (an image of one page of a document can be also used as necessary).

The entire character image to be recognized is first sent from the input section 1 to the character memory 2 in FIG. 1. The character position data is sent to the manager. Explaining in FIG. 8, the position data of (1), (3), (4) and (5) and data indicating that it is unknown whether the character images of (3) and (4) construct one character or two characters are sent. The manager sends the character position data of (1), (2), (3), (4) and (5) to FIG. 1 on the basis of the above data. The construction of FIG. 1 extracts the features in accordance with the order of (1), (2), (3), (4) and (5) and transfers the feature vectors to the recognizer 10. During the above period of time, the content in the character memory is not changed. (There is no need to send the feature vectors every extraction of the character feature.) The recognizer sends the candidate characters and the distance value to the manager 12 in accordance with the order of (1) to (5). If the first candidate of (2) is a separate character like "\" with response to the characters (2) to (4), the characters of (1), (2) and (3) are sent to the output section 11 from the manager. If the first candidate of each of (3) and (4) is a half-width character, the characters of (1), (3), (4) and (5) are supplied to the output section 11. In the other cases, the distance values are compared and the nearer value is generated.

In the invention, since the manager has grasped the positional relation of the characters, it is possible to decide that a character "-" is an underline or a minus symbol from the positional relations.

⑧ [Shift adding means]

FIGS. 1A and 1B are diagrams most preferably showing the invention. As also mentioned in ⑦, the image size which can be handled is limited to the number of bits of A(x) and B(y).

In FIGS. 3A to 3D, $2^2$ has been multiplied to B(y). Therefore, B(y)'=B(y)/$2^2$ is stored into the table memory B and the addition of A(x)+(B(y)<<3) is executed by the character extractor, so that the image memory of eight times (=$2^3$) can be handled. (If a unit of one word is equal to 2 Bytes, the image memory of 16 times (=$2^4$) can be handled.)

⑨ [3+8]

FIGS. 1A and 1 B are diagrams most preferably showing the invention.

In FIGS. 4A and 4C, B(y)'=B(y)/$2^2$ is stored into the table memory B. In FIGS. 4B and 4D, A(x)'=A(x)/$2^2$ is stored into the table memory A. The controller 6 stores the character direction from the computer 2 and transfers to the feature extractor 5. The feature extractor 5 executes the addition of A(x)+(B(y)<<3) in the case of FIGS. 5A and 5C and the addition of (A(x)<<3)+B(y) in the case of FIGS. 4B and 4D. Due to this, in a manner similar to the case of ⑧, there are advantages such that the capacities of the table memories can be saved and the features in four character directions can be extracted.

In FIG. 1, in the case where the computer 2, feature extractor 5, and controller 6 construct one computer, the computer 2 forms the contents in the table memories A and B in accordance with the character format and subsequently executes the feature extracting process after the normalizing process with reference to the table memories A and B in accordance with the feature extracting program. By extracting the features with reference to the contents in the table memories A and B, the computer 2 can execute many kinds of processes by the same program irrespective of the character direction, inclination, and the like. . . . (The case where the processing speed of the computer is high and the case where no problem occurs with respect to the processing time.)

It is also possible to construct in a manner such that the computer 2 in FIG. 1 executes a managing operation in FIGS. 5 and 9.

In FIG. 1, it is also possible to construct in a manner such that the character position data and the character image are stored into the character memory and the computer 2 reads out the character position data from character memory 3 and processes. (Since a format in the character memory can be arbitrarily set, the resources can be effectively used.)

Figure 12:
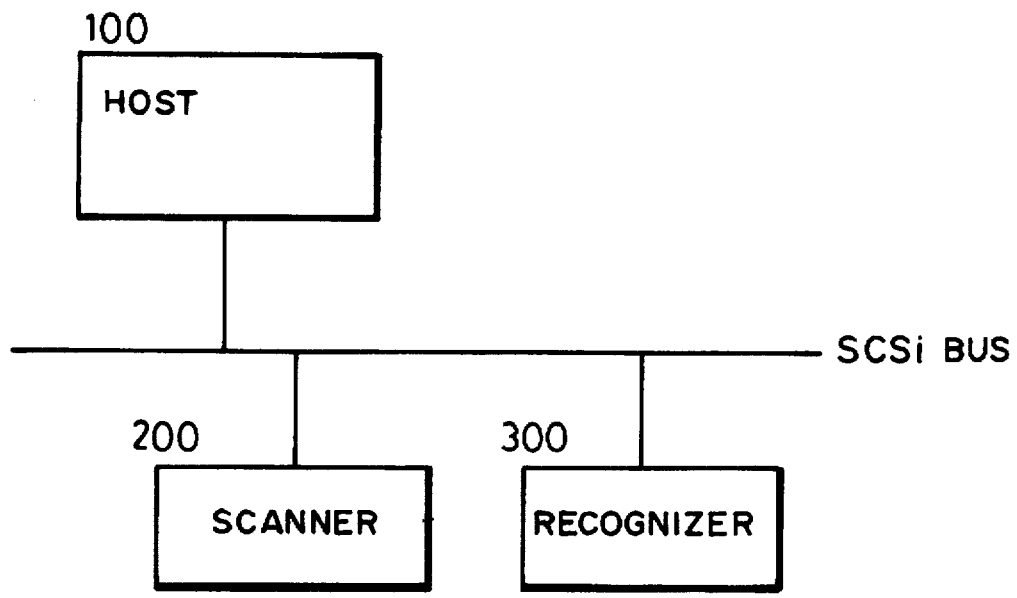
FIG. 12 is a constructional block diagram of a whole apparatus.

FIG. 12 is a constructional block diagram of a whole apparatus. Reference numeral 100 denotes a host computer to execute processes such as image input, area designation, cutting-out of character, and document edition. Reference numeral 200 indicates a scanner which sends a document image to the host computer 100 and 300 denotes a recognizer for extracting features (FIG. 1) in accordance with the character image format sent from the host computer 100, for recognizing by using the feature vectors derived, and thereby for sending the character codes of the candidate characters from the character image to the host computer 100.

I claim:

1. An image processing apparatus comprising:

image memory means for storing input image data;

conversion value memory means comprising (1) an x-coordinate section for storing n-number of x-coordinate normalization addresses, corresponding to n-number of coordinates, provided for normalizing the input image data, and (2) a y-coordinate section for storing n-number of y-coordinate normalization addresses, corresponding to n-number of coordinates, provided for normalizing the input image data, wherein said conversion value memory means sets the x-coordinate normalization addresses and the y-coordinate normalization addresses in accordance with a size and a format of a character in the input image data stored in said image memory means; and generating means (1) for obtaining a coordinate value of the normalized image data corresponding to the input image data by summing values stored at the x-coordinate and y-coordinate normalization addresses, and (2) for providing the obtained coordinate value to a feature extractor.

2. An image processing apparatus comprising:

image memory means for storing input image data;

table making means for calculating coordinate normalization addresses for normalizing the input image data and for making a table comprising (1) an x-coordinate section for storing n-number of x-coordinate normalization addresses corresponding to n-number of coordinates, and (2) a y-coordinate section for storing n-number of y-coordinate normalization addresses corresponding to n-number of coordinates, wherein said table making means makes the table in accordance with a size and a format of a character in the input image data stored in said image memory means; and conversion means for converting coordinate data of the input image data in accordance with a total sum of values stored at the x-coordinate and y-coordinate normalization addresses in the table made by said table making means.

3. An image processing method comprising the steps of:

storing input image data;

storing both x-coordinate normalization addresses corresponding to n-number of coordinate and y-coordinate normalization addresses corresponding to n-number of coordinates, provided from normalizing the input image data, wherein the x-coordinate normalization addresses and the y-coordinate normalization addresses are set in accordance with a size and a format of a character in the input image data stored in the storing step;

obtaining a coordinate value of the normalized image data corresponding to the input image data by summing values stored at the x-coordinate normalization address and the y-coordinate normalization address; and providing the obtained coordinate value to a feature extractor.

4. An image processing method comprising the steps of:

storing input image data;

calculating coordinate normalization addresses for normalizing the input image data and for making a table comprising (1) a x-coordinate section for storing n-number of x-coordinate normalization addresses corresponding to n-number of coordinates, and (2) a y-coordinate section for storing y-coordinate normalization addresses corresponding to n-number of coordinates, wherein the table is made in accordance with a size and a format of a character in the input image data stored in the storing step; and converting coordinate data of the input image data in accordance with a total sum of values stored at the x-coordinate and y-coordinate normalization addresses in the made table.

5. A computer-readable memory medium storing computer-executable process steps, the steps comprising:

a first storing step to store input image data;

a storing step to store both x-coordinate normalization addresses corresponding to n-number of coordinate and y-coordinate normalization addresses corresponding to n-number of coordinates, provided from normalizing the input image data, wherein the x-coordinate normalization addresses and the y-coordinate normalization addresses are set in accordance with a size and a format of a character in the input image data stored in the first storing step;

an obtaining step to obtain a coordinate value of the normalized image data corresponding to the input image data by summing values stored at the x-coordinate normalization address and the y-coordinate normalization address; and a providing step to provide the obtained coordinate value to a feature extractor.

6. A computer-readable memory medium storing computer-executable process steps, the steps comprising:

a storing step to store input image data;

a calculating step to calculate coordinate normalization addresses for normalizing the input image data and to make a table comprising (1) a x-coordinate section for storing n-number of x-coordinate normalization addresses corresponding to n-number of coordinates, and (2) a y-coordinate section for storing y-coordinate normalization addresses corresponding to n-number of coordinates, wherein the table is made in accordance with a size and a format of a character in the input image data stored in the storing step; and a converting step to convert coordinate data of the input image data in accordance with a total sum of values stored at the x-coordinate and y-coordinate normalization addresses in the table.

7. An apparatus according to claim 1, wherein the coordinate conversion value is obtained by determining a formula from values which can be obtained from format information input and by evaluating the formula.

8. An apparatus according to claim 1, wherein each of the x-coordinate and y-coordinate normalization addresses stores coordinate conversion values of a number corresponding to normalization size width in its coordinate.

9. An apparatus according to claim 2, wherein the coordinate conversion data is obtained by determining a formula from values which can be obtained from format information input, and by evaluating the formula.

10. An apparatus according to claim 2, wherein each of the x-coordinate and y-coordinate normalization addresses stores coordinate conversion values of a number corresponding to normalization size widths in its coordinate.

11. An apparatus according to claim 1, further comprising means for executing a character recognition process for the normalized image data generated by said generating means.

12. An apparatus according to claim 11, further comprising means for outputting a result of the character recognition process with a SCSI bus.

13. An apparatus according to claim 1, further comprising scanner means for inputting the image data.

14. An apparatus according to claim 2, further comprising means for executing a character recognition process for the extracted pixel data stored in said normalized image memory means.

15. An apparatus according to claim 14, further comprising means for outputting a result of the character recognition process with a SCSI bus.

16. An apparatus according to claim 2, further comprising scanner means for inputting image data.

17. A method according to claim 3, further comprising the step of executing a character recognition process for the normalized image data.

18. A method according to claim 17, further comprising the step of outputting a result of the character recognition process with a SCSI bus.

19. A method according to claim 3, further comprising the step of inputting the image data with a scanner.

20. A method according to claim 4, further comprising the step of executing a character recognition process for the stored pixel data.

21. A method according to claim 20, further comprising the step of outputting a result of the character recognition process with a SCSI bus.

22. A method according to claim 4, further comprising the step of inputting the image data with a scanner.

23. An apparatus according to claim 1, wherein the format represents an attribute of character inclination.

24. An apparatus according to claim 1, wherein the format represents an attribute of character direction.

25. An apparatus according to claim 2, wherein the format represents an attribute of character inclination.

26. An apparatus according to claim 2, wherein the format represents an attribute of character direction.

27. A method according to claim 3, wherein the format represents an attribute of character inclination.

28. A method according to claim 3, wherein the format represents an attribute of character direction.

29. A method according to claim 4, wherein the format represents an attribute of character inclination.

30. A method according to claim 4, wherein the format represents an attribute of character direction.

31. A computer-readable memory medium storing computer-executable process steps according to claim 5, wherein the format represents an attribute of character inclination.

32. A computer-readable memory medium storing computer-executable process steps according to claim 5, wherein the format represents an attribute of character direction.

33. A computer-readable memory medium storing computer-executable process steps according to claim 6, wherein the format represents an attribute of character inclination.

34. A computer-readable memory medium storing computer-executable process steps according to claim 6, wherein the format represents an attribute of character direction.

* * * * *